United States Patent
Ratcliff

[19]

[11] Patent Number: 6,065,595
[45] Date of Patent: May 23, 2000

[54] FISHING BOX

[76] Inventor: William R. Ratcliff, 2626 E. 72nd St., Tulsa, Okla. 74136

[21] Appl. No.: 09/337,000

[22] Filed: Jun. 21, 1999

[51] Int. Cl.⁷ .............................. B65D 85/00; A01K 97/08
[52] U.S. Cl. ..................... 206/315.11; 206/457; 206/543; 43/26; 220/522
[58] Field of Search ............................... 206/315.11, 457, 206/541–545, 547, 549; 43/21.2, 26, 54.1; 220/521, 522

[56] References Cited

U.S. PATENT DOCUMENTS

| | | |
|---|---|---|
| D. 388,606 | 1/1998 | Zak et al. . |
| 2,371,517 | 3/1945 | Groulx . |
| 2,501,270 | 3/1950 | Fleming . |
| 2,541,890 | 2/1951 | Schaperkotter et al. ................. 220/522 |
| 2,672,232 | 3/1954 | Kessell, Jr. .............................. 206/543 |
| 2,673,783 | 3/1954 | Rahm et al. ............................. 220/522 |
| 3,310,905 | 3/1967 | Davis et al. . |
| 3,348,329 | 10/1967 | Seemann . |
| 3,678,611 | 7/1972 | Files . |
| 3,802,113 | 4/1974 | Gatto, Sr. . |
| 4,170,801 | 10/1979 | Ward ................................... 206/315.11 |
| 5,242,050 | 9/1993 | Billings .............................. 206/315.11 |
| 5,305,544 | 4/1994 | Testa, Jr. . |
| 5,425,194 | 6/1995 | Miller ................................. 206/315.11 |
| 5,547,079 | 8/1996 | Pino . |
| 5,960,950 | 10/1999 | Meeker et al. ........................ 206/15.11 |

*Primary Examiner*—Paul T. Sewell
*Assistant Examiner*—Luan K. Bui
*Attorney, Agent, or Firm*—Frank J. Cattalano

[57] ABSTRACT

A fishing box has a case outwardly shaped to suggest use for fishing. The case has mating hinged upper and lower segments, the lower segment being formed from thermally insulating material. A tray formed from thermally insulating material is removably nestled in the lower segment to define a thermally discrete lower compartment. A mechanism disposed in the upper segment permits a rod and reel to be removably stored in the box. A sub-compartment in the upper segment stores dry foods separated by the tray and by the rod from cold foods in the lower compartment. Preferably, the lower compartment is sized and contoured to store a beverage container, such as a twelve ounce can of pop, and the upper sub-compartment is sized and contoured to store a sandwich.

19 Claims, 4 Drawing Sheets

FISHING BOX

BACKGROUND OF THE INVENTION

This invention relates generally to fishing equipment and more particularly concerns an all purpose fishing box particularly suited for use by kids goin' fishin'.

There are many specialized and all purpose boxes designed for experienced anglers to carry their rods, reels, baits, tools, food and drink. In order to meet the needs of the experienced angler, these boxes are generally large and heavy and far more elaborate than the needs of a typical kid at a fishin' hole. Nevertheless, despite their complexity and size, the experienced angler's boxes are not suited to meet the needs of the young angler.

A kid wants a fishing box that says he is a fisherman, not a carpenter or a plumber. A kid needs a fishing box that carries not only his fishing gear but also that all important snack essential to every successful fishing excursion. And it is especially important that the cookies or sandwich are separated from the cold drink so that they will be kept crisp and tasty and especially so that neither the dry foods nor the cold foods are co-mingled with the baits so as to ruin a fisherman's appetite.

It is, therefore, an object of this invention to provide a fishing box especially suited for use in a kid's trip to the fishin' hole. It is also an object of this invention to provide a fishing box which, by its outer configuration, tells the neighborhood that a kid is goin' fishin'. Another object of this invention is to provide a fishing box which has a thermal compartment suitable for storing cold foods and beverages such as a can of pop. Another object of this invention is to provide a fishing box which provides a separate compartment for dry foods such as a sandwich or cookies. A further object of this invention is to provide a fishing box adapted to carry a telescoping fishing rod and reel. Yet another object of this invention is to provide a fishing box which has a separately covered tray for holding lures, baits and the like. Perhaps more importantly, it is an object of this invention to provide a fishing box in which the cold foods compartment is separated from the dry foods compartment by a tackle tray sealed from the food compartments. And it is an object of this invention to provide a fishing box in which the dry and cold food compartments are separated by not only the tackle tray but also by a space accommodating the rod so as to further assure that the cold foods remain cold, the dry foods remain dry, the tackle remains untangled and none of them begin to smell like the other.

SUMMARY OF THE INVENTION

In accordance with the invention, a fishing box has a case outwardly shaped to suggest use for fishing. The case has mating hinged upper and lower segments. The lower segment is formed from thermally insulating material and has an external base which supports the case in an upright position. The upper segment has an external handle to facilitate carrying the case. The upper and lower segments have latch components cooperable to secure the case in a closed condition. A tray formed from thermally insulating material is removably nestled in the lower segment to define a thermally discrete lower compartment. Preferably, the tray is divided by a grid into a plurality of tackle storage sections closed by at least one hinged cover. Preferably, a pair of covers are seated in end-to-end relationship on and hinged at opposite ends of the tray and a latch mounted on the tray releasably secures the pair of covers in a closed condition. A mechanism disposed in the upper segment permits a rod and reel to be removably stored in the box.

Preferably, the rod telescopes between a shortened condition for storage and a lengthened condition for fishing and the storage mechanism is at least two spaced-apart vertical panels fixed in the upper compartment. The panels have slots for receiving the shortened rod and the slots have latches mounted on their respective panels for closing the slots with the rod inserted therein. A removable panel above the rod defines a sub-compartment in the upper segment for storing dry foods separated by the tray and the rod from cold foods in the lower compartment. The sub-compartment is preferably formed by a removable horizontal panel extending between two of the vertical panels. A latch removably secures the horizontal panel between the vertical panels. Preferably, the lower compartment is sized and contoured to store a beverage container, such as a twelve ounce can of pop, and the upper sub-compartment is sized and contoured to store a sandwich.

BRIEF DESCRIPTION OF THE DRAWINGS

Other objects and advantages of the invention will become apparent upon reading the following detailed description and upon reference to the drawings in which.

DETAILED DESCRIPTION

Figure 1:
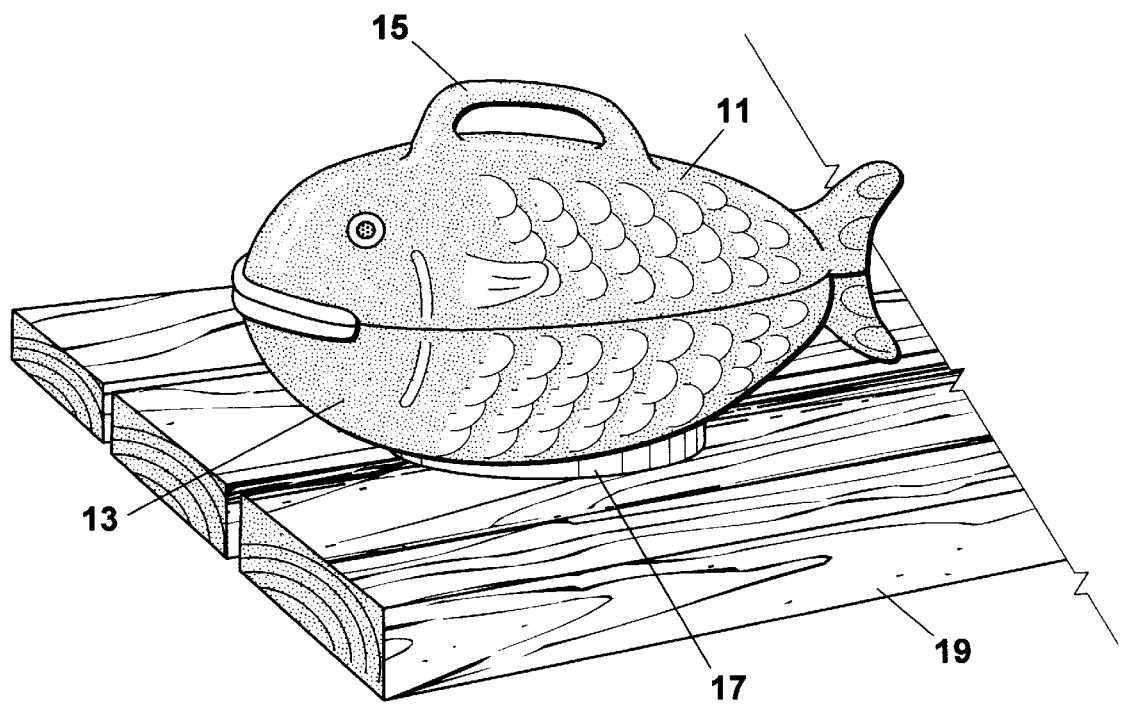
FIG. 1 is a perspective view of the fishing box in a closed condition.

Turning to the Figures, a preferred embodiment of the exterior of the fishing box is illustrated in FIGS. 1, 3, 4 and 5. The box consists of a case formed from upper and lower mating segments 11 and 13 preferably outwardly shaped to suggest that the box is intended for use in fishing. For example, the box shown is a three dimensional caricature of a fish. The upper segment 11 includes an external handle 15 to facilitate carrying and the lower segment 13 includes an external base 17 for supporting the case in an upright position on a surface such as a table top 19.

Figure 2:
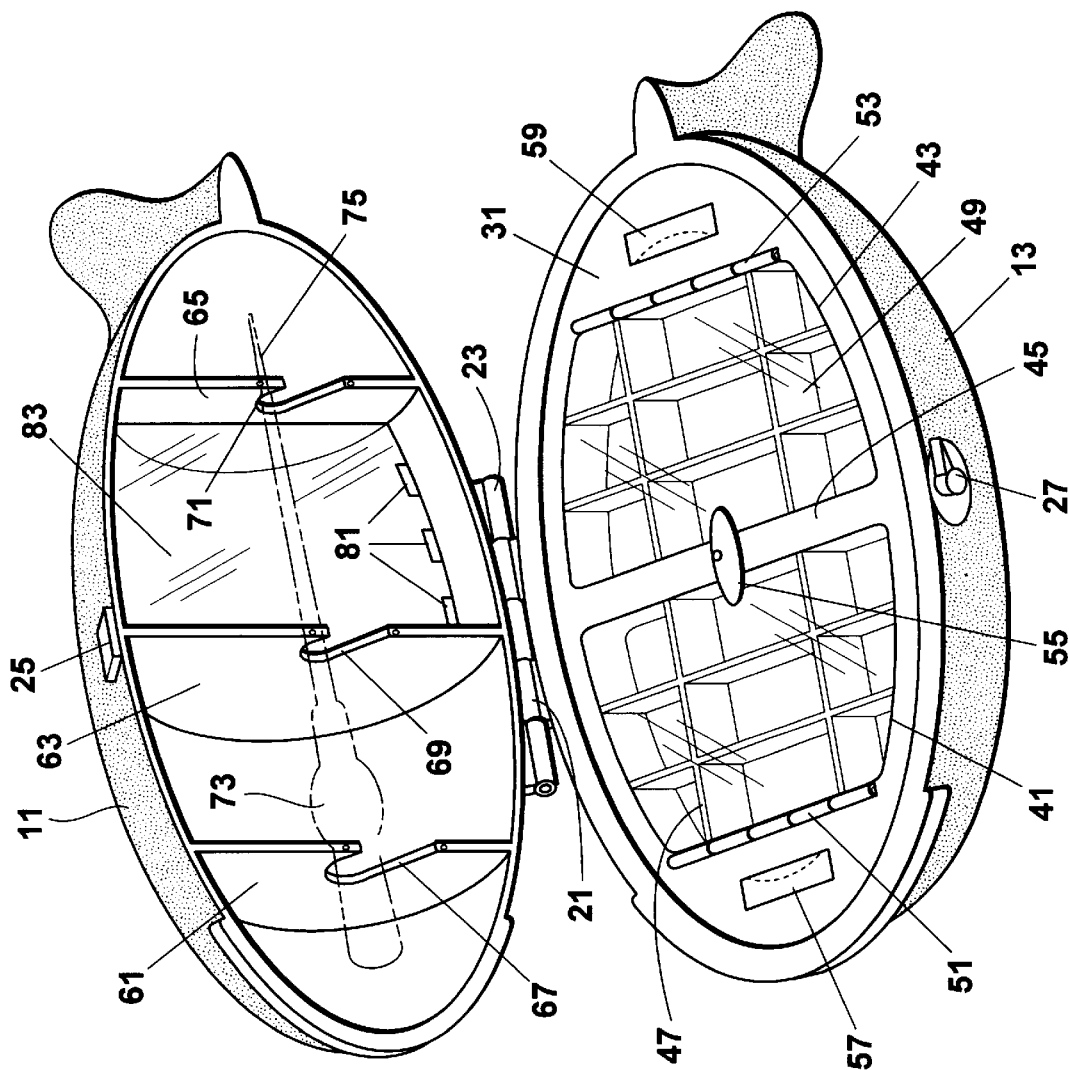
FIG. 2 is a perspective view of the fishing box of FIG. 1 in an opened condition.
Figure 3:
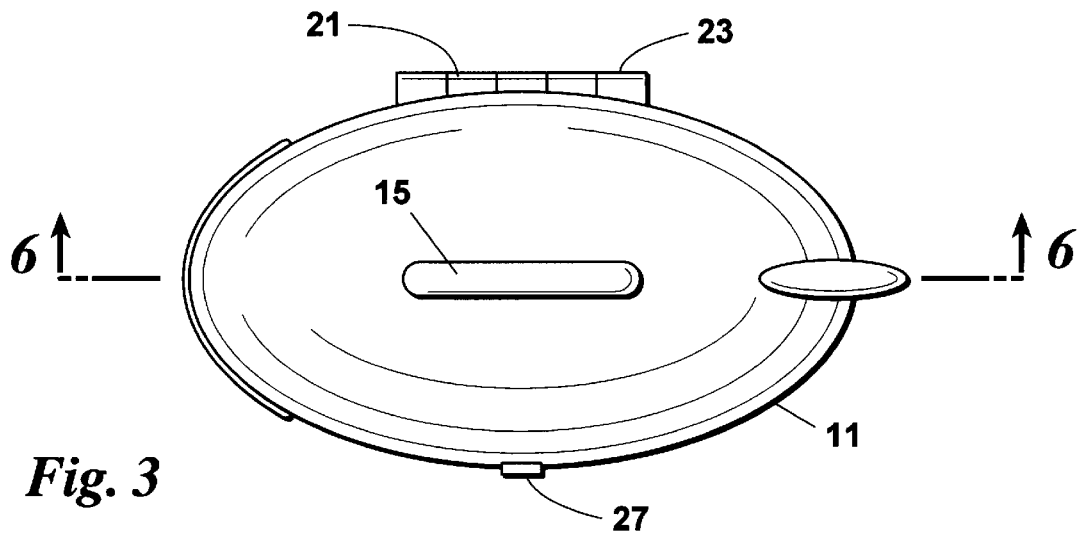
FIG. 3 is a top plan view of the fishing box of FIG. 1.
Figure 4:
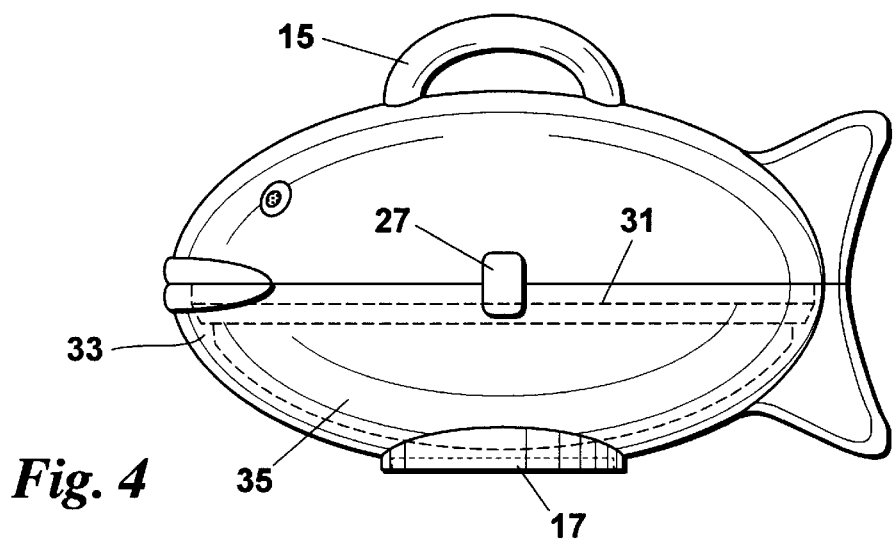
FIG. 4 is a side elevation view of the fishing box of FIG. 1.
Figure 5:
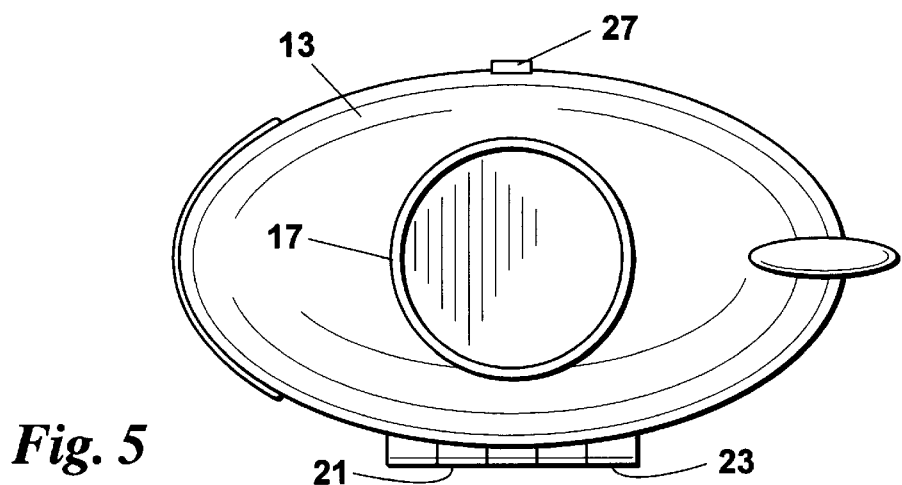
FIG. 5 is a bottom plan view of the fishing box of FIG. 1.
Figure 7:
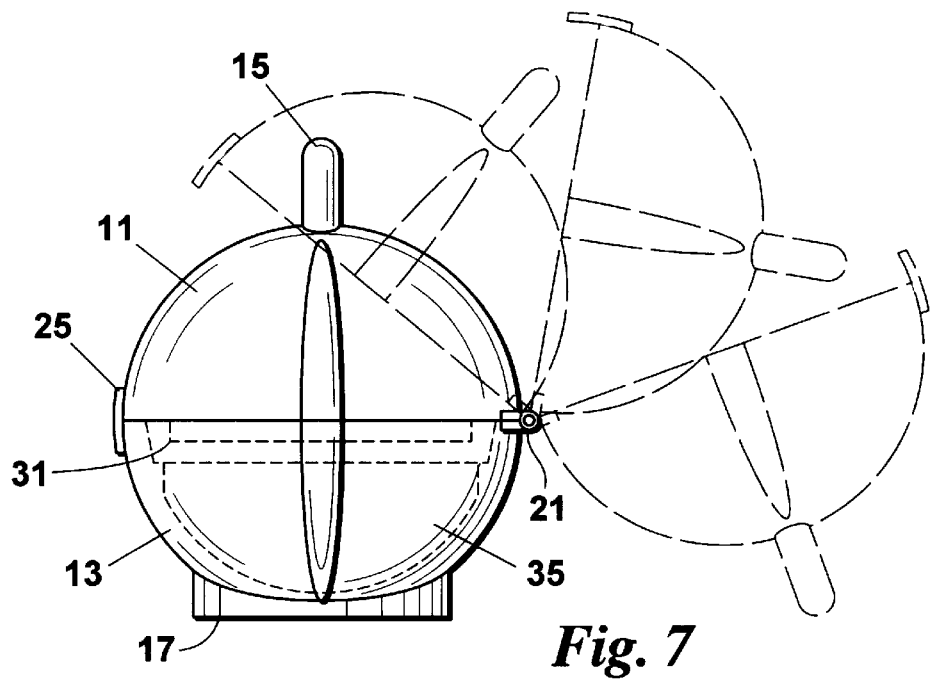
FIG. 7 is an end elevation view illustrating the rotation of the upper segment of the fishing box of FIG. 1 from the closed condition to the opened condition.
Figure 8:
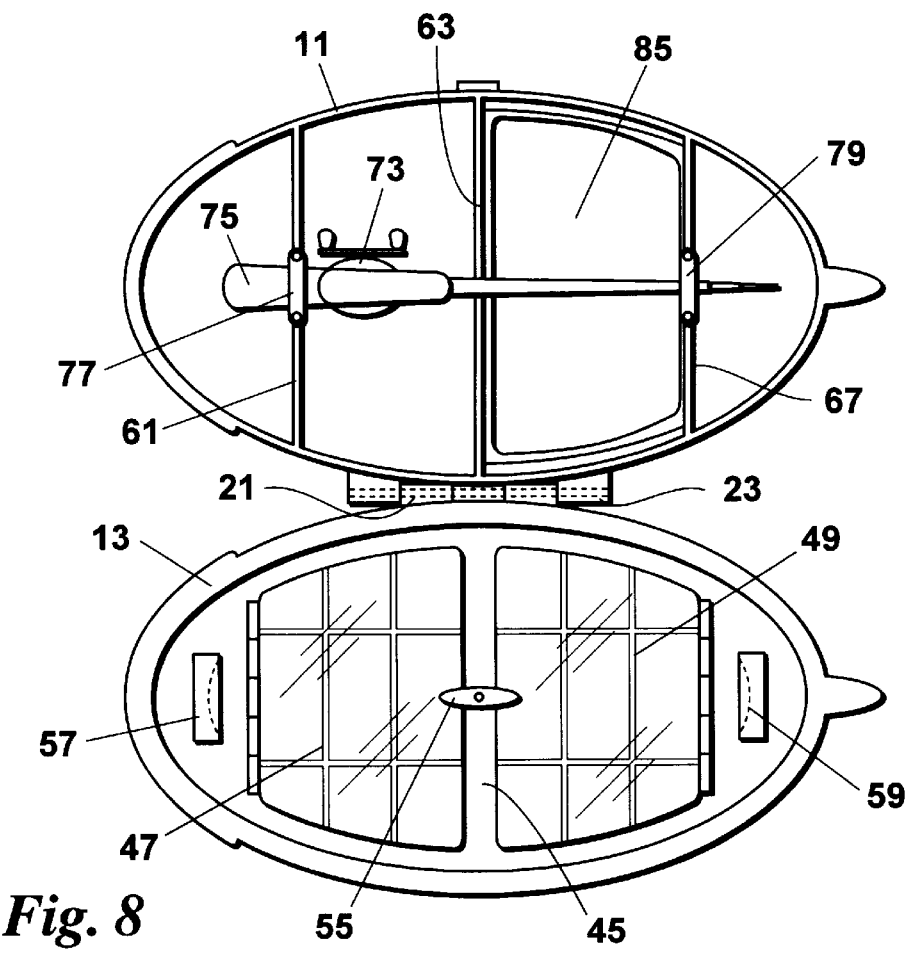
FIG. 8 is a top plan view of the fishing box of FIG. 1 in the opened condition.

As is best seen in FIGS. 2, 7 and 8 the upper mating segment 11 is connected to the mating lower segment 13 by hinges 21 and 23 so that the upper segment 11 can be rotated to open the case and permit access to its interior. The components 25 and 27 of a latching mechanism are mounted on the segments 11 and 13 for securing the case in the closed condition.

A tray 31 is removably nestled in the case to divide the case into upper and lower storage compartments. As can best be seen in FIGS. 4, 6 and 7, the lower mating segment 13 is provided with an annular seat 33 proximate its upper perimeter on which the tray 31 is seated. The lower mating segment 13 and the tray 31 are made of a thermally insulating material, such as high density polyethylene (HDPE), so as to define a thermally discrete lower compartment 35 which, as can best be seen in FIG. 6, can be used to store cold foods and beverages, such as a twelve ounce can of pop 37. As seen in FIGS. 2 and 8, the tray 31 preferably has two sub-compartments 41 and 43 separated by a rib 45. Each of the sub-compartments 41 and 43 are further subdivided into a plurality of smaller tackle storage compartments by grids 47 and 49 which are seated in or molded as part of the tray 31. Preferably, the sub-compartments 41 and 43 are closed by a pair of covers 51 and 53 hinged to the tray 31. A rotating latch 55 is pivotally mounted on the rib 45 to simultaneously secure both of the covers 51 and 53 in the closed position over the sub-compartments 41 and 43. For convenience, finger grips 57 and 59 may be provided on opposite ends of the tray 31 to facilitate removal of the tray from its seat 33 in the lower segment 13.

Figure 6:
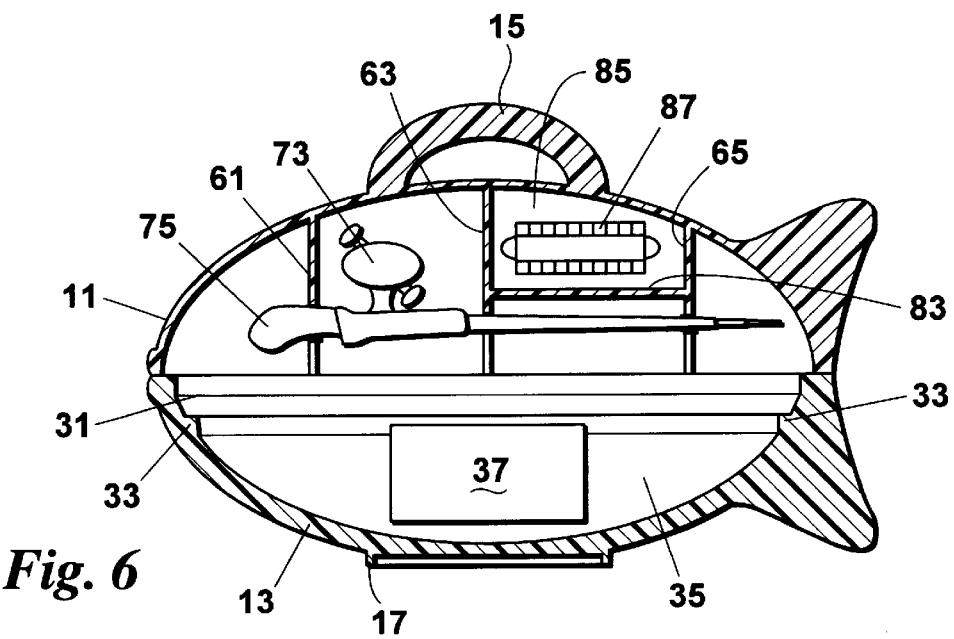
FIG. 6 is a cross-sectional view of the fishing box taken along the line 6—6 of FIG. 3.

Looking at FIGS. 2, 6 and 8, the upper segment 11 has several vertical panels 61, 63 and 65 extending transversely across the box. Each of the panels 61, 63 and 65 has a slot 67, 69 and 71. The panels 61, 63 and 65 are spaced apart so that a fishing reel 73 mounted on a telescoping fishing rod 75 can be inserted between two of the panels 61 and 63 when the closed telescoping rod is inserted into the slots 67, 69 and 71. As shown, the lower edges of two of the panels 61 and 65 are provided with rotating brackets 77 and 79 so that the rod 75 can be secured in place in the slots 67, 69 and 71.

As can best be seen in FIGS. 2 and 6, the upper segment 11 is also provided with seats 81 against which a panel 83 can be horizontally seated. The horizontal panel defines an upper sub-compartment 85 for storing dry foods and is preferably sized and contoured to hold a sandwich 87. Preferably, the seats 81 are positioned so that, when the horizontal panel 83 is in place and the rod 75 is inserted in the slots 69, 79 and 71, the rod 75 holds the horizontal panel 83 against the seats 81.

As is shown in FIG. 6, dry foods are stored in the upper sub-compartment 85 separated from cold foods stored in the thermally discrete lower compartment 35 by the tray 31 and the space around the rod 75 in the upper segment 11. Cold foods are kept cold, dry foods are kept fresh and crisp and the fishing lures, baits, hooks and the like are sealed in the tray 31.

The mating segments 11 and 13 need not be hinged, but may be fastened on both sides by releasable clasps. The tray 31 may have any number of separately covered compartments or only one covered compartment. The overall size and shape of the box may vary, but it is preferred that the cold and dry food compartments be configured to store a beverage can and a sandwich.

Thus, it is apparent that there has been provided, in accordance with the invention, a fishing box that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A fishing box comprising:
   a case having mating upper and lower segments;
   means disposed on said upper and lower segments for latching said segments, when mated, in a closed condition;
   a tray removably nestled in and dividing said case into upper and lower storage compartments;
   means disposed in said upper storage compartment for securing a rod and reel therein; and
   means disposed above the rod defining a sub-compartment in said upper compartment separated from said lower compartment by said tray and the rod.

2. A fishing box according to claim 1, said tray and said lower segment thermally insulating said lower storage compartment.

3. A fishing box according to claim 2, said lower compartment being sized and contoured to store a beverage container.

4. A fishing box according to claim 3 further comprising a grid seated in and dividing said tray into a plurality of sections.

5. A fishing box according to claim 4 further comprising a removable cover seated on said tray over said plurality of sections.

6. A fishing box according to claim 4 further comprising a pair of covers seated in end-to-end relationship on and hinged at opposite ends of said tray.

7. A fishing box according to claim 6 further comprising a latch mounted on said tray for releasably securing said pair of covers in a closed condition.

8. A fishing box according to claim 3, said rod telescoping between a shortened condition for storage and a lengthened condition for fishing.

9. A fishing box according to claim 8, said rod and reel securing means comprising at least two spaced-apart vertical panels fixed in said upper compartment and having slots for insertion of the rod in the shortened condition therein.

10. A fishing box according to claim 9, each of said slots having a latch mounted on its respective panel for closing said slots with the rod inserted therein.

11. A fishing box according to claim 9, said sub-compartment being formed by a removable horizontal panel extending between two of said vertical panels.

12. A fishing box according to claim 11 further comprising means for removably securing said horizontal panel between said vertical panels.

13. A fishing box according to claim 12, said sub-compartment being sized and contoured to store a sandwich.

14. A fishing box according to claim 1 further comprising an external base on said lower segment for supporting said case in an upright position.

15. A fishing box according to claim 1 further comprising an external handle on said upper segment for carrying said case.

16. A fishing box according to claim 1, said case being outwardly shaped to suggest use for fishing.

17. A fishing box comprising:
   a case having mating upper and lower segments;
   means disposed on said upper and lower segments for latching said segments, when mated, in a closed condition;
   a tray divided into a plurality of storage sections and having a removable cover, said tray being removably nestled in and dividing said case into upper and lower compartments, said tray and said lower segment being formed of thermally insulating material;
   means disposed in said upper storage compartment for removably storing a rod and reel therein; and
   means disposed above the rod and defining a sub-compartment in said upper compartment separated from said lower compartment by said tray and the rod.

18. A fishing box comprising:
   a case having hinged upper and lower segments having means disposed thereon for latching said case in a closed condition;

a tray divided into a plurality of storage sections covered by at least one hinged cover and removably nestled in and dividing said case into upper and lower storage compartments, said tray and said lower segment being formed of thermally insulating material;

means disposed in said upper storage compartment for removably storing a rod and reel therein; and means disposed above the rod and defining an upper sub-compartment in said upper storage compartment separated from said lower compartment by said tray and the rod.

19. A fishing box comprising:

a case outwardly shaped to suggest use for fishing, said case having hinged upper and lower segments, said lower segment being formed from thermally insulating material and having an external base for supporting said case in an upright position, said upper segment having an external handle for carrying said case and said upper and lower segments having means disposed thereon for latching said case in a closed condition;

a tray formed from thermally insulating material and divided into a plurality of tackle storage sections covered by at least one hinged cover, said tray being removably nestled in said lower segment to define a thermally discrete lower compartment;

means disposed in said upper segment for removably storing a rod and reel therein; and means disposed above the rod and defining a sub-compartment in said upper segment, said sub-compartment for storing dry foods separated from said lower compartment for storing cold foods by said tray and the rod.

* * * * *